United States Patent
Benazzi et al.

[11] Patent Number: 6,136,290
[45] Date of Patent: *Oct. 24, 2000

[54] IM-5 ZEOLITE, A PROCESS FOR ITS PREPARATION AND CATALYTIC APPLICATIONS THEREOF

[75] Inventors: Eric Benazzi, Chatou; Jean-Louis Guth, Mulhouse; Loïc Rouleau, Oullins, all of France

[73] Assignee: Institut Francais de Petrole, France

[*] Notice: This patent is subject to a terminal disclaimer.

[21] Appl. No.: 08/955,117

[22] Filed: Oct. 21, 1997

[30] Foreign Application Priority Data

Oct. 21, 1996 [FR] France ..................... 96 12873

[51] Int. Cl.[7] ............ C01B 39/48; B01J 29/06; C10G 11/05
[52] U.S. Cl. ............ 423/705; 423/706; 423/708; 423/718; 423/709; 502/63; 502/66; 502/73; 502/74; 208/46; 208/120
[58] Field of Search ............ 423/705, 706, 423/708, 709, 718; 502/63, 66, 73, 74; 208/120, 46

[56] References Cited

U.S. PATENT DOCUMENTS

| | | |
|---|---|---|
| 4,941,963 | 7/1990 | Valyocsik ............ 423/706 |
| 5,068,096 | 11/1991 | Valyocsik ............ 423/706 |

FOREIGN PATENT DOCUMENTS

0 135 658  4/1985  European Pat. Off. .

*Primary Examiner*—Mark L. Bell
*Assistant Examiner*—David Sample
*Attorney, Agent, or Firm*—Millen, White, Zelano, & Branigan, P.C.

[57] ABSTRACT

The invention concerns IM-5 zeolite with a chemical composition with the following formula, expressed in terms of the mole ratios of the oxides for the anhydrous state: $100XO_2, mY_2O_3, pR_{2/n}O$ where m is 10 or less; p is in the range 0 to 20; R represents one or more cations with valency n; X represents silicon and/or germanium; Y represents one or more of the following elements: aluminum, iron, gallium, boron and titanium. The zeolite is characterized by an Xray diffraction diagram, in its as synthesized state, which comprises the results shown in Table 1 of the description. The invention also concerns the preparation of the zeolite, any catalyst containing the zeolite and any catalytic process using such a catalyst.

22 Claims, 2 Drawing Sheets

IM-5 ZEOLITE, A PROCESS FOR ITS PREPARATION AND CATALYTIC APPLICATIONS THEREOF

SUMMARY OF THE INVENTION

The present invention concerns a novel zeolite hereinafter termed IM-5, a process for its preparation, any catalyst containing the catalyst and any catalytic process using the catalyst.

Because of their properties of geometric selectivity and ion exchange, zeolites are widely used in industry both for adsorption (for example drying gas, separation of aromatic compounds etc . . . ) and for catalysis (for example catalytic cracking, hydrocracking, isomerisation, oligomerisation, etc . . . ).

While a large number of aluminosilicate type zeolites exist in nature, over the last few years the search for new microporous molecular sieves has led to the synthesis of a wide variety of such molecular sieves and thus also to a wide variety of aluminosilicates with a zeolitic structure, variety being in their chemical composition, in the diameter of the pores they contain, in the shape and in the geometry of their microporous systems.

Among the zeolites which have been synthesised over the last forty years, a certain number of solids can be cited which have represented significant advances in the fields of adsorption and catalysis. Examples are Y zeolite (U.S. Pat. No. 3,130,007), and ZSM-5 zeolite (U.S. Pat. No. 3,702,886). More recently, the number of new molecular sieves, (including zeolites), synthesised each year has greatly increased. A more complete description of the different molecular sieves which have been discovered can be obtained by referring to the "Atlas of Zeolite Structure Types", W. M. Meier and D. H. Olson, Third Revised Edition, 1992, Butterworth-Heinemann. The following can be cited: NU-87 zeolite (U.S. Pat. No. 5,178,748), MCM-22 zeolite (U.S. Pat. No. 4,954,325) or CLO type gallophosphate (cloverite) (U.S. Pat. No. 5,420,279). NU-88 zeolite described in French patent 96/10.507 can also be cited; some of its passages are reproduced below.

NU-88 zeolite is characterized by:

i) a chemical composition with the following formula, expressed in terms of the mole ratios of the oxides for the anhydrous state:

where
m is 10 or less;
p is in the range 0 (excluded) to 20;
R represents one or more cations with valency n;
X represents silicon and/or germanium, preferably silicon;
Y is selected from the group formed by the following elements: aluminium, iron, gallium, boron, titanium, vanadium, zirconium, molybdenum, arsenic, antimony, chromium and manganese, Y preferably being aluminium; and ii) an X ray diffraction diagram, in its as synthesized state, which comprises the results shown in table A.

TABLE A

X ray diffraction table for NU-88 zeolite (as synthesized state)

| $d_{hkl}$ ($10^{-10}$ m) | $I/I_{max}$ |
|---|---|
| 12.1 ± 0.35 | s or vs (1) |
| 11.0 ± 0.30 | s (1) |
| 9.88 ± 0.25 | m (1) |
| 6.17 ± 0.15 | w |
| 3.97 ± 0.09 | vs (2) |
| 3.90 ± 0.08 | vs (2) |
| 3.80 ± 0.08 | w (2) |
| 3.66 ± 0.07 | vw |
| 3.52 ± 0.07 | vw |
| 3.27 ± 0.07 | vw |
| 3.09 ± 0.06 | w |
| 2.91 ± 0.06 | w |
| 2.68 ± 0.06 | vw |
| 2.49 ± 0.05 | vw |
| 2.20 ± 0.05 | vw |
| 2.059 ± 0.05 | w |
| 1.729 ± 0.04 | vw |

(1) These peaks were not resolved and formed part of the same feature.
(2) These peaks were not resolved and formed part of the same feature.

NU-88 in its hydrogen form, termed H-NU-88, produced by calcining and/or ion exchange, has an X ray diffraction diagram which comprises the results shown in the table B:

TABLE B

X ray diffraction table for NU-88 zeolite (hydrogen form)

| $d_{hkl}$ ($10^{-10}$m) | $I/I_{max}$ |
|---|---|
| 12.1 ± 0.35 | vs (1) |
| 11.0 ± 0.30 | s or vs (1) |
| 9.92 ± 0.25 | w or m (1) |
| 8.83 ± 0.20 | vw |
| 6.17 ± 0.15 | w |
| 3.99 ± 0.10 | s or vs (2) |
| 3.91 ± 0.08 | vs (2) |
| 3.79 ± 0.08 | w or m (2) |
| 3.67 ± 0.07 | vw |
| 3.52 ± 0.07 | vw |
| 3.09 ± 0.06 | w |
| 2.90 ± 0.06 | w |
| 2.48 ± 0.05 | w |
| 2.065 ± 0.05 | w |
| 1.885 ± 0.04 | vw |
| 1.733 ± 0.04 | vw |

(1) These peaks were not resolved and formed part of the same feature.
(2) These peaks were not resolved and formed part of the same feature.

These diagrams were obtained using a diffractometer and a conventional powder method utilising the $K_\alpha$ line of copper, Cu K alpha. From the position of the diffraction peaks represented by the angle 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
weak (w) means less than 20;
medium (m) means in the range 20 to 40;
strong (s) means in the range 40 to 60;
very strong (vs) means more than 60.

The X ray diffractograms from which the data are obtained (spacing d and relative intensities) are characterized by wide reflections with a large number of peaks forming shoulders on other peaks of higher intensity. Some or all of the shoulders may not be resolved. This may be the case for samples with low crystallinity or for samples with crystals which are small enough to produce significant broadening of the X rays. This can also be the case when the equipment or operating conditions used to produce the diagram differ from those used in the present case.

NU-88 zeolite is considered to have a novel basic structure or topology which is characterized by its X ray diffraction diagram. NU-88 zeolite in its "as synthesized state" has substantially the X ray diffraction characteristics shown in Table A, and is thus distinguished from prior art zeolites.

In the chemical composition defined above, m is generally in the range 0.1 to 10, preferably 0.2 to 9, and more preferably 0.6 to 8; it appears that NU-88 zeolite is generally and most readily obtained in a very pure form when m is in the range 0.6 to 8.

The present invention thus concerns a novel zeolitic structure, termed IM-5, with a chemical composition with the following formula, expressed in terms of the mole ratios of the oxides for the anhydrous state:

$$100XO_2, mY_2O_3, pR_{2/n}O$$

where m is 10 or less;

p is in the range 0 (excluded) and 20;

R represents one or more cations with valency n;

X represents silicon and/or gerimanium, preferably silicon;

Y is selected from the group formed by the following elements: aluminium, iron, gallium, boron, and titanium, Y preferably being aluminium; and is characterized by an X ray diffraction diagram, in its as synthesized state, which comprises the results shown in Table 1.

The invention also concerns IM-5 zeolite in its hydrogen form, designated H-IM-5, obtained by calcining step(s) and/or ion exchange step(s) as will be explained below. The H-IM-5 zeolite has an X ray diffraction diagram which comprises the results shown in Table 2.

TABLE 1

X ray diffraction table for IM-5 zeolite (as synthesized state)

| $d_{hkl}$ (Å) | $I/I_{max}$ |
|---|---|
| 11.8 ± 0.35 | s to vs (1) |
| 11.5 ± 0.30 | s to vs (1) |
| 11.25 ± 0.30 | s to vs (1) |
| 9.95 ± 0.20 | m to s |
| 9.50 ± 0.15 | m to s |
| 7.08 ± 0.12 | w to m |
| 6.04 ± 0.10 | vw to w |
| 5.75 ± 0.10 | w |
| 5.65 ± 0.10 | w |
| 5.50 ± 0.10 | vw |
| 5.35 ± 0.10 | vw |
| 5.03 ± 0.09 | vw |
| 4.72 ± 0.08 | w to m |
| 4.55 ± 0.07 | w |
| 4.26 ± 0.07 | vw |
| 3.92 ± 0.07 | s to vs (2) |
| 3.94 ± 0.07 | vs (2) |
| 3.85 ± 0.05 | vs (2) |
| 3.78 ± 0.04 | s to vs (2) |
| 3.67 ± 0.04 | m to s |
| 3.55 ± 0.03 | m to s |
| 3.37 ± 0.02 | w |
| 3.30 ± 0.015 | w |
| 3.099 ± 0.012 | w to m |
| 2.970 ± 0.007 | vw to w |

TABLE 1-continued

X ray diffraction table for IM-5 zeolite (as synthesized state)

| $d_{hkl}$ (Å) | $I/I_{max}$ |
|---|---|
| 2.815 ± 0.005 | vw |
| 2.720 ± 0.005 | vw |

(1) Peaks forming part of a feature.
(2) Peaks forming part of the same feature.

TABLE 2

X ray diffraction table for IM-5 zeolite (hydrogen form), H-IM-5, obtained by calcining

| $d_{hkl}$ (Å) | $I/I_{max}$ |
|---|---|
| 11.8 ± 0.30 | s to vs (1) |
| 11.45 ± 0.25 | vs (1) |
| 11.20 ± 0.20 | s to vs (1) |
| 9.90 ± 0.15 | m to s |
| 9.50 ± 0.15 | m to s |
| 7.06 ± 0.12 | w to m |
| 6.01 ± 0.10 | vw to w |
| 5.70 ± 0.10 | w |
| 5.30 ± 0.10 | vw |
| 5.03 ± 0.09 | vw |
| 4.71 ± 0.08 | w |
| 4.25 ± 0.07 | vw |
| 3.87 ± 0.07 | m to s (2) |
| 3.81 ± 0.05 | m to s (2) |
| 3.76 ± 0.04 | m to s (2) |
| 3.67 ± 0.04 | w to m |
| 3.54 ± 0.04 | m to s |
| 3.37 ± 0.03 | w |
| 3.316 ± 0.015 | w |
| 3.103 ± 0.102 | w |
| 3.080 ± 0.010 | w to m |
| 2.950 ± 0.010 | vw to m |
| 2.880 v 0.007 | vw |
| 2.790 ± 0.005 | vw |
| 2.590 ± 0.005 | vw |

(1) Peaks form part of a feature.
(2) Peaks form part of the same feature.

These diagrams were obtained using a diffractometer and a conventional powder method utilising the $K_\alpha$ line of copper. From the position of the diffraction peaks represented by the angle 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 20;

weak (w) means less than 20;

medium (m) means in the range 20 to 40;

strong (s) means in the range 40 to 60;

very strong (vs) means more than 60.

The X ray diffractograms from which the data are obtained (spacing d and relative intensities) are characterized by wide reflections with a large number of peaks forming shoulders on other peaks of higher intensity. Some or all of the shoulders may not be resolved. This may be the case for samples with low crystallinity or for samples with crystals which are small enough to produce significant broadening of the X rays. This can also be the case when the equipment or operating conditions used to produce the diagram differ from those used in the present case.

IM-5 zeolite is considered to have a novel basic structure or topology which is characterized by its X ray diffraction diagram. IM-5 zeolite in its "as synthesized state" has substantially the X ray diffraction characteristics shown in Table 1 (see also an example of a diffractogram in FIG. 1), and is thus distinguished from prior art zeolites. Similarly H-IM-5 zeolite, obtained by calcining and/or ion exchange steps, has substantially the characteristics shown in Table 2 (see also the diffractogram in FIG. 2). The invention also concerns any zeolite with the same structural type as that of IM-5 zeolite.

In the chemical composition defined above, m is generally in the range 0.1 to 10, preferably 0.3 to 9, and more preferably 0.5 to 8; it appears that IM-5 zeolite is generally and most readily obtained in a very pure form when m is in the range 0.8 to 8.

This definition also includes IM-5 zeolite in its "as synthesized state", as well as the forms obtained on dehydration and/or calcining and/or ion exchange. The term "in its as synthesized state" designates the product obtained by synthesis and washing, with or without drying or dehydration. In its "as synthesized state", IM-5 zeolite may contain a cation of metal M, which is an alkali, in particular sodium, and/or ammonium, and it may contain organic nitrogen-containing cations such as those described below or their decomposition products, or precursors thereof. These organic nitrogen-containing cations are designated here by the letter Q, which also includes decomposition products and precursors of the organic nitrogen-containing cations.

Thus IM-5 zeolite in its "as synthesized state" (not calcined) has a chemical composition with the following formula, expressed in terms of the mole ratios of the oxides for the anhydrous state:

$100XO_2:10$ or less $Y_2O_3:10$ or less Q:10 or less $M_2O$, where

M is at least one alkali metal cation (group IA of the periodic table) and/or ammonium;

Q is at least one organic nitrogen-containing cation or a precursor of an organic nitrogen-containing cation or a decomposition product of an organic nitrogen-containing cation;

at least one compound of type M or Q being present;

X is silicon and/or germanium, preferably silicon;

Y is selected from the group formed by the following elements: aluminium, iron, gallium, boron, and titanium, Y preferably being aluminium; and characterized in that it has an X ray diffraction diagram, in its as synthesized state, which comprises the results shown in Table 1.

The compositions indicated above for IM-5 zeolite are given for the anhydrous state, since the IM-5 zeolite in its "as synthesized state" and activated forms of the IM-5 zeolite, i.e., resulting from calcining and/or ion exchange, may contain water. The mole ratio of $H_2O$ of such forms, including IM-5 zeolite in its "as synthesized state", depends on the conditions under which it is prepared and stored after synthesis: or activation. The mole quantities of water contained in these forms are typically in the range 0 to 100% $XO_2$.

The calcined forms of IM-5 zeolite do not contain an organic nitrogen-containing compound, or contain a lesser quantity than the "as synthesized state", since the major portion of the organic substance has been eliminated, generally by heat treatment consisting of burning off the organic substance in the presence of air, the hydrogen ion ($H^+$) thus forming the other cation.

Thus the IM-5 zeolite in its calcined form has a chemical composition with the following formula, expressed in terms of the mole ratios of the oxides for the anhydrous state:

$100XO_2:10$ or less $Y_2O_3:$in the range 0 (excluded) to 10 $M_2O$, where

M is at least one alkali metal cation (group IA of the periodic table) and/or ammonium and/or hydrogen;

X represents silicon and/or germanium, preferably silicon;

Y is selected from the group formed by the following elements: aluminium, iron, gallium, boron, titanium, Y preferably being aluminium; and characterized in that it has an X ray diffraction diagram, in its as synthesized state, which comprises the results shown in Table 2.

Of the IM-5 zeolite forms which can be obtained by ion exchange, the ammonium form ($NH_4^+$) is important as it can readily be converted into the hydrogen form by calcining. The hydrogen form and forms containing metals introduced by ion exchange will be described below. In some cases, the fact that the zeolite of the invention is subjected to the action of an acid can give rise to partial or complete elimination of a base element such as aluminium, as well as generation of the hydrogen form. This may constitute a means of modifying the composition of the substance after it has been synthesized.

The invention also includes IM-5 zeolite in its hydrogen form, termed H-IM-5, produced by calcining step(s) and/or ion exchange step(s) as will be described below.

In one aspect, the invention concerns IM-5 zeolite at least partially in its $H^+$ form (as defined above) or in its $NH_4^+$ form or in its metal form, the metal being selected from the group formed by groups IA, IB, IIA, IIB, IIIA, IIIB (including the rare earths), VIII, Sn, Pb and Si, preferably at least partially in its $H^+$ form or at least partially in its metal form. This type of zeolite generally has an X ray diffraction diagram which includes the results shown in Table 1.

The invention also concerns a process for the preparation of IM-5 zeolite in which an aqueous mixture is reacted which comprises at least one source of at least one oxide $XO_2$, at least one source of at least one oxide $Y_2O_3$, optionally at least one source of at least one oxide $M_2O$, and at least one organic nitrogen-containing cation Q, or a precursor of an organic nitrogen-containing cation or a decomposition product of an organic nitrogen-containing cation, the mixture generally having the following molar composition:

$XO_2/Y_2O_3$ at least 10, preferably 15 to 55, more preferably 25 to 45;

$(R_{1/n})OH/XO_2$ of 0.01 to 2, preferably 0.05 to 1, more preferably 0.10 to 0.75, still more preferably 0.4 to 0.75;

$H_2O/XO_2$ of 1 to 400, preferably 10 to 200, more preferably 20 to 70;

$Q/XO_2$ of 0.01 to 1, preferably 0.02 to 1, more preferably 0.05 to 0.4;

$L_qZ/XO_2$ of 0 to 4, preferably 0 to 1, more preferably 0 to 0.25;

where X is silicon and/or germanium, preferably silicon;

Y is selected from the group formed by the following elements: aluminium, iron, boron, titanium, and gallium, Y preferably being aluminium;

R is a cation with valency n which may comprise M (an alkali metal and/or ammonium cation) and/or Q (an organic nitrogen-containing cation or a precursor thereof or a decomposition product thereof);

$L_qZ$ is a salt, Z being an anion with valency q and L an alkali metal ion or ammonium ion which may be similar to M or a mixture of M and a further alkali metal or ammonium ion required to balance anion Z, and Z may comprise an acid radical which is added, for example, in the form of a salt of L or an aluminium salt.

In some cases, it may be of advantage to add a salt $L_qZ$. Thus in a preferred preparation process, the aqueous medium comprises that salt. Examples of Z are the radicals of strong acids such as bromide, chloride, iodide, sulphate, phosphate or nitrate, or the radicals of weak acids such as organic acid radicals, for example citrate or acetate. While $L_qZ$ is not essential, it may accelerate crystallisation of the IM-5 zeolite from a reaction medium and it may also affect the size and shape of crystals containing the IM-5 zeolite. In all cases, the reaction is carried out until crystallisation occurs.

In accordance with the invention, Q is preferably a cation, pentane-1,5-bis (methylpyrrolidinium) (n=5) and hexane-1,6-bis(methylpyrrolidinium) (n=6), with general formula:

or one of its decomposition products or one of its precursors. The source of the organic cation can, for example, be salts of chloride or bromide or the hydroxide. Thus in this formula, n equals 5 or 6.

M and/or Q can be added in the form of hydroxides or the salts of mineral acids provided that the $(R_{1/n})OH/XO_2$ ratio is satisfied.

Such substances can be used in the form of simple mixtures or they can be pre-heated together in the reactor, preferably in solution, before adding the other reactants required for the synthesis of the IM-5 zeolite.

Cation M is preferably an alkali metal, in particular sodium; $XO_2$ is preferably silica ($SiO_2$) and the oxide $Y_2O_3$ is preferably alumina ($Al_2O_3$).

In the preferred case when X is silicon, the source of the silicon can be any one of those which are currently used in the zeolite synthesis, for example solid or powdered silica, silicic acid, colloidal silica or dissolved silica. Examples of powdered silica are precipitated silicas, in particular those obtained by precipitation from a solution of an alkali metal silicate such as that known as "KS 300" manufactured by AKZO, and similar products, aerosil silicas, fumed silicas, for example "CAB-O-SIL", and silica gels in suitable concentrations for use in reinforcing pigments for rubber and silcone rubber. Colloidal silicas with different particle sizes can be used, for example those with an average equivalent diameter in the range 10 to 15 $\mu$m or in the range 40 to 50 $\mu$m such as those sold under the trade names "LUDOX", "NALCOAG" and "SYTON". Dissolved silicas which can be used also include commercially available soluble glass silicates containing 0.5 to 6.0, in particular 2.0 to 4.0, moles of $SiO_2$, per mole of alkali metal oxide, "active" alkali metal silicates as defined in United Kingdom patent GB-A-1 193 254, and silicates obtained by dissolving silica in an alkali metal hydroxide or a quaternary ammonium hydroxide, or a mixture thereof.

In the preferred case where Y is aluminium, the alumina source is preferably sodium aluminate or an aluminium salt, for example aluminium chloride, nitrate or sulphate, an aluminium alkoxide or alumina itself, preferably in its hydrated or hydratable form, such as colloidal alumina, pseudoboehmite, gamma alumina or alpha or beta trihydrate. Mixtures of the sources cited above can also be used.

Some or all of the alumina and silica sources can optionally be added in the form of an aluminosilicate.

The reaction mixture is generally reacted at an autogenous pressure, optionally by adding gas, for example nitrogen, at a temperature which is in the range 85° C. to 200° C., preferably in the range 120° C. to 180° C., and more preferably at a temperature which does not exceed 165° C., until IM-5 zeolite crystals are formed, the time period generally being between 1 hour and several months depending on the composition of the reaction mixture and the temperature used. The reaction can be carried out with or without stirring, preferably without stirring.

It may be of advantage to use seeds to reduce the time required for crystal formation and/or the total time required for crystallisation. It may also be of advantage to encourage formation of IM-5 zeolite and discourage impurities. Such seeds comprise zeolites, in particular crystals of IM-5 zeolite. The crystalline seeds are generally added in a proportion which is in the range 0.01% to 10% by weight of the silica used in the reaction mixture.

At the end of the reaction, the solid phase is recovered by filtering then washing; it is then ready for subsequent steps such as drying, dehydration and calcining and/or ion exchange.

If the reaction product contains alkali metal ions, these must be at least partially eliminated to prepare the hydrogen form of IM-5 zeolite, by ion exchange with an acid, in particular a mineral acid such as hydrochloric acid and/or using an ammonium compound obtained by ion exchange with a solution of an ammonium salt such as ammonium chloride. Ion exchange can be effected by forming a thick suspension in an ion exchange solution, repeating one or more times. The zeolite is generally calcined before carrying out ion exchange to eliminate all absorbed organic substances in order to facilitate ion exchange. All of the operating conditions of such an ion exchange step are known to the skilled person.

In general, the cation(s) of the IM-5 zeolite can be replaced by any metal cation or cations, in particular those from groups IA, IB, IIA, IIB, IIIA, IIIB (including the rare earths), and VIII (including the noble metals) of the periodic table, and by tin, lead and bismuth. Exchange is normally carried out using a solution containing a suitable cation salt, in a manner which is known to the skilled person.

The invention also concerns the composition of a catalyst containing IM-5 zeolite. Thus in one aspect, the invention provides a catalyst comprising an IM-5 zeolite as described above or prepared using the preparation process described above. The invention also concerns a catalyst comprising such an IM-5 zeolite, and which further comprises a binder or at least one support or at least one other zeolite or at least one metal selected from the group formed by the elements Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

In the catalysts of the invention, $XO_2$ is preferably silica and $Y_2O_3$ is preferably alumina. Such catalysts can be used in a large number of catalytic processes and with a wide range of supply feeds.

Forms of IM-5 zeolite which can be used for catalysis generally include the hydrogen and ammonium forms prepared using the methods described above. However, the catalysts of the invention comprising IM-5 zeolite can also contain one or more elements, in particular metals or their cations, or compounds of these elements, in particular metal oxides. These catalysts can be prepared by ion exchange or by impregnating the IM-5 zeolite with said element, cation or compound, or with a suitable precursor of said cation or compound. Such an ion exchange or impregnation step can be carried out on the IM-5 zeolite which is at least partially, preferably almost completely, in its "as synthesized state", which may or may not be calcined, in its hydrogen form and/or in its ammonium form and/or in any other exchanged form (metallic or non metallic).

When a form of IM-5 zeolite containing a metal is prepared by ion exchange, it may be desirable to exchange the metal completely, meaning that substantially all of the exchangeable sites are occupied by that metal. Such forms may be of particular application to separation processes. In the majority of cases, however, it is preferable to carry out only partial exchange of the metal, the remaining sites being occupied by another cation, in particular hydrogen or ammonium cations. In some cases, it may be desirable to introduce two or more metal cations by ion exchange.

When the IM-5 zeolite is impregnated with a metallic compound to form a catalyst, the metallic compound can be added in a suitable proportion, but a maximum proportion of 20% by weight is generally sufficient for the majority of applications; for some applications, 10% by weight is not generally exceeded, and quantities of up to 5% are often appropriate. Impregnation can be carried out using any suitable known method for catalyst preparation.

The metal-exchanged forms or the metallic compound-impregnated forms can be used as they are or they can be treated to produce an active derivative. These treatments include reduction, for example in an atmosphere containing hydrogen, to produce a metal or other reduced forms. These treatments can be carried out at an appropriate stage in the preparation of the catalyst or they can readily be carried out in the catalytic reactor.

Catalytic compositions comprising IM-5 zeolite can, if desired, be combined with a mineral matrix which is either catalytically inert or catalytically active. The matrix can be used solely as a binder to keep the zeolite particles together, or it can be in a particular shape, for example a pellet or an extruded product, or it can act as an inert diluting agent, for example to control the activity per unit weight of the catalyst. When the mineral matrix or diluent themselves have catalytic activity, they can form an effective part of the zeolite-matrix catalytic composition. Suitable mineral matrices and diluents include substances which are conventionally used as catalyst supports such as silica, the different forms of alumina, clays such as bentonites, montmorillonites, sepiolite, attapulgite, fuller's earth and porous synthetic materials such as silica-alumina, silica-zirconia, silicathoria, silica-glucina or silica-titanium dioxide. Combinations of matrices can be used within the context of the present invention, in particular combinations of inert matrices and matrices with catalytic activity.

When the IM-5 zeolite is associated with a mineral matrix substance or with a plurality of such substances, the proportion of matrix substance(s) in the total composition can generally be up to 90% by weight, preferably up to 50% by weight, and more preferably up to 30% by weight.

For certain applications, a further zeolite or molecular sieve can be used conjointly with the IM-5 zeolite to form a catalyst. Such a combination can be used as it is or combined with one or more of the matrix substances described above. A particular example of the use of such a composition is its use as an additive for a fluid catalytic cracking catalyst, when the IM-5 zeolite is preferably used in a proportion of 0.5% to 5% by weight of the total catalyst.

For other applications, the IM-5 zeolite can be combined with another catalyst such as platinum on alumina.

Any method which is suitable for mixing the IM-5 zeolite with an organic matrix and/or another zeolite can be used, in particular that adapted to the final form in which the catalyst is used, for example an extruded, pelletized or granulated product.

If IM-5 zeolites are used to form a catalyst conjointly with a metallic component (for example a hydrogenation/dehydrogenation component or another metal with catalytic activity) in addition to the mineral matrix, the metallic component can be exchanged or impregnated into the IM-5 zeolite itself before adding the matrix substance, or it can be added to the zeolite-matrix composition. For certain applications, it may be of advantage to add the metallic component to all or part of the matrix substance before mixing the latter with the IM-5 zeolite.

A wide range of hydrocarbon conversion catalysts comprising IM-5 zeolite can be prepared by ion exchange or by impregnating the zeolite with one or more cations or oxides derived from elements such as: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

When catalysts comprising IM-5 zeolite contain one or more hydrogenation/dehydrogenation components such as the metals Ni, Co, Pt, Pd, Re or Rh, these components can be introduced by ion exchange or by impregnating with a suitable compound of this metal.

Catalytic compositions comprising IM-5 zeolite can be used in reactions involving saturated and unsaturated aliphatic hydrocarbons, aromatic hydrocarbons, organic oxygen-containing compounds and organic compounds containing nitrogen and/or sulphur, also organic compounds containing other functional groups.

Thus in another aspect, the invention concerns any catalytic process in which IM-5 zeolite is comprised in the catalyst. In general, catalyst compositions containing IM-5 zeolite can be effectively used to carry out reactions of isomerisation, transalkylation and dismutation, alkylation and dealkylation, dehydration and hydration, oligomerisation and polymerisation, cyclisation, aromatization, cracking, hydrogenation and dehydrogenation, oxidation, halogenation, amine synthesis, hydrodesulpurization, hydrodenitration, catalytic elimination of oxides of nitrogen (either, as is preferable, by reduction, generally using nitrogen-containing compounds or using hydrocarbons, or by decomposition), ether formation and hydrocarbon conversion and the synthesis of organic compounds in general.

The processes mentioned above can be carried out either in the liquid phase, or in the vapour phase, under conditions selected so as to be the most suitable for each individual reaction. As an example, reactions carried out in the vapour phase can comprise the use of fluid bed, fixed bed or moving bed operations. Diluents can be used if necessary. Depending on the process used, suitable diluents may be inert gases (such as nitrogen or helium), hydrocarbons, carbon dioxide, water or hydrogen. The diluent can be inert or it can have a chemical action. It may be of advantage, in particular if hydrogen is used, to include a metallic component such as a hydrogenation/dehydrogenation component in the catalyst composition, for example one or more of the metals Ni, Co, Pt, Pd, Re or Rh.

The present invention also concerns any hydrocarbon conversion process during which an alkylbenzene or a mixture of alkylbenzenes is brought into contact in the liquid or vapour phase with a catalyst containing IM-5 zeolite, under isomerisation conditions.

Isomerisation reactions for which catalysts containing IM-5 zeolite are particularly useful are those comprising alkanes and substituted aromatic molecules, in particular xylenes. These reactions can include those which can be carried out in the presence of hydrogen. Catalyst compositions containing IM-5 zeolite which are of particular application in isomerisation reactions include those in which the IM-5 zeolites is present in the acid form (H), in the form obtained after ion exchange, in the form containing metals or in combinations of these forms. Forms in which the metal is a hydrogenation/dehydrogenation component such as Ni, Co, Pt, Pd, Re or Rh are of particular application.

Particular isomerisation reactions for which a catalyst containing IM-5 zeolite are of use include isomerisation and hydro-isomerisation of xylenes, or of paraffins, in particular normal $C_4$ to $C_{10}$ hydrocarbons, or the isomerisation of olefins, and catalytic dewaxing.

Isomerisation and hydro-isomerisation of xylene can be carried out in the liquid or vapour phase. In the liquid phase, suitable isomerisation conditions include a temperature which is in the range 0° C. to 350° C., a pressure which is in the range 0.1 to 20 MPa (absolute), preferably in the range 0.5 to 7 MPa (absolute), and when using a flow system, a weight hourly space velocity (WHSV) which is preferably in the range 1 to 30 $h^{-1}$ based on the total catalyst composition. A diluent can optionally be present, preferably one or more thereof, having a high critical temperature under the isomerisation conditions. The diluent, if used, can comprise 1% to 90% by weight of the feed. The isomerisation and hydroisomerisation reactions for xylene in the vapour phase are carried out at a temperature which is in the range 100° C. and 600° C., preferably in the range 200° C. 500° C., at a pressure which is in the range 0.05 to 10 MPa (absolute), preferably between 0.1 and 5 MPa (absolute), and at a weight hourly space velocity (WHSV) of up to 80 based on the total catalyst composition.

When xylene is isomerised in the presence of hydrogen (in the vapour phase), the hydrogen/dehydrogenation component which is preferably used is Pt or Ni. The hydrogenation/dehydrogenation component is generally added in a proportion which is in the range 0.5% to 2% of the total catalyst weight. Supplemental metals and/or metal oxides can be present in the catalyst composition.

When xylene is isomerised, ethylbenzene can be present in the xylene feed in a proportion which can reach 40% by weight. With catalyst compositions which include IM-5 zeolite, ethylbenzene generally transalkylates with itself and with xylenes to form heavier and lighter aromatic compounds. Ethylbenzene generally also reacts to form benzene and light gas, in particular at temperatures of more than 400° C. With such xylene feeds containing ethylbenzene, when the reaction is carried out in the presence of hydrogen with a catalytic composition comprising IM-5 zeolite and a hydrogenation/dehydrogenation component, a certain portion of the ethylbenzene is transformed to xylenes by isomerisation. It may also be of advantage to carry out the xylene isomerisation reactions in the presence of a hydrocarbon compounds, in particular a paraffin or a naphthene, with or without the complementary presence of hydrogen. The hydrocarbon appears to improve catalyst performance in that reactions which cause a loss of xylenes are suppressed and, in particular when the reactions are carried out in the absence of hydrogen, the lifetime of the catalyst is increased.

The present invention also concerns a process for converting hydrocarbons in which one or more alkylated aromatic compounds are brought into contact, in the vapour or liquid phase, with a catalyst containing IM-5 zeolite under transalkylation conditions.

Catalysts containing IM-5 zeolite are particularly useful in transalkylation and/or dismutation reactions, in particular in reactions involving aromatic molecules which are mono-, di-, tri- or tetrasubstituted with alkyl groups, in particular toluene and xylenes.

Catalyst compositions containing IM-5 zeolite which have been found to be of particular application for transalkylation and/or dismutation reactions include compositions in which the IM-5 component is present in its acid form ($H^+$), the form obtained by cation exchange, or other forms containing metals or combinations of these different forms. The acid form and the form in which the metal is a hydrogenation/dehydrogenation component such as Ni, Co, Pt, Pd, Re or Rh are particularly effective.

Particular examples of important processes are the dismutation of toluene and the reaction of toluene with aromatic compounds containing at least 9 carbon atoms per molecule, for example trimethylbenzenes.

Toluene dismutation can be carried out in the vapour phase, and in the presence or absence of hydrogen, although it is preferable to operate in the presence of hydrogen since this helps to suppress catalyst deactivation. The most favourable reaction conditions are: temperature in the range 250° C. to 650° C., preferably in the range 300° C. to 550° C.; pressure in the range 0.03 to 10 MPa (absolute), preferably in the range 0.1 to 5 MPa (absolute); and weight hourly space velocity (WHSV) up to 50 (based on the total catalyst composition).

When toluene dismutation is carried out in the presence of hydrogen, the catalyst can optionally contain a hydrogenation/dehydrogenation component. Preferably, a hydrogenation/dehydrogenation component such as Pt, Pd or Ni is used. The hydrogenation/dehydrogenation component is normally added in a concentration which can reach 5% by weight of the total catalyst composition. Complementary metals and/or metal oxides can be present in the catalyst composition, for example up to 5% by weight of the total catalyst composition.

The present invention also concerns a process for the conversion of hydrocarbons in which an olefinic or aromatic compound is brought into contact with a suitable alkylating compound under alkylation conditions, in the vapour phase or in the liquid phase, and with a catalyst containing IM-5 zeolite.

Examples of alkylation reactions for which catalysts containing IM-5 zeolite are of particular use are the alkylation of benzene or aromatic molecules substituted with methanol or an olefin or an ether. Specific examples of such processes are the methylation of toluene, the synthesis of ethylbenzene and the formation of ethyltoluene and cumene. The alkylation catalysts used in processes in accordance with this implementation of the invention can comprise other substances, in particular metal oxides, which can improve catalytic performance.

Because a catalyst containing IM-5 zeolite is used, hydrocarbons can be produced by oligomerisation, cyclisation and/or aromatization reactions of unsaturated compounds such as ethene, propene or butene, or of saturated compounds such as propane or butane or of mixtures of hydrocarbons such as light naphthas. For some reactions, in particular aromatization reactions, the catalyst may usefully contain a metal or metal oxide, in particular platinum, gallium, zinc or oxides thereof.

Catalysts containing IM-5 zeolite are used for a wide range of cracking reactions, among them cracking of olefins, paraffins or aromatic compounds, or mixtures thereof. Using IM-5 zeolite as a fluid catalytic cracking additive is particularly useful in improving the cracking reaction product. IM-5 zeolite can also be used as a component of a catalyst for catalytic dewaxing in hydrocracking processes.

Hydrogenation and/or dehydrogenation processes, for example the dehydrogenation of alkanes to the corresponding olefins, are effectively carried out by bringing the appropriate feed into contact, under suitable conditions, with a catalyst containing IM-5 zeolite, in particular when the latter also comprises a hydrogenation/dehydrogenation component such as Ni, Co, Pt, Pd, Re or Ru.

A catalyst containing IM-5 zeolite is also useful for ether formation, in particular when reacting two alcohols or when reacting an olefin with an alcohol.

The invention will now be illustrated by the following examples.

EXAMPLES

Example 1

Synthesis of IM-5 zeolite with Pentane-1,5-bis (methylpyrrolidinium) Bromide (PentPyrr)

The structure of pentane-1,5-bis(methylpyrrolidinium) bromide is as follows:

38 g of water was poured onto a solid mixture containing 3.6 g of Aerosil 130 silica, 4.08 g of PentPyrr and 0.144 g of calcined NU-88 seeds (obtained by grinding a sample from a previous synthesis). Stirring was carried out until a homogeneous mixture was obtained, then a solution obtained by dissolving 0.32 g of Carlo Erba sodium aluminate (54% $Al_2O_3$, 37% $Na_2O$) and 1.22 g of caustic soda (NaOH) in 20 g of water was added, maintaining the stirring. This gel was stirred for 15 minutes before being transferred into an autoclave provided with a PTFE (polytetrafluoroethylene) sleeve.

The molar composition of the gel corresponded to:

60 $SiO_2$, 1.70 $Al_2O_3$, 18 $Na_2O$, 10 PentPyrr, 3000 $H_2O$

The autoclave was oven heated for 8 days at 170° C. under static conditions. After filtering, washing with $H_2O$ and drying at 60° C., 2.95 g of product was obtained.

Analysis of the Si, Al and Na in the product was carried out using atomic emission spectroscopy. The following molar composition was determined:

100 $SiO_2$; 4.0 $Al_2O_3$; 0.144 $Na_2O$.

Figure 1:
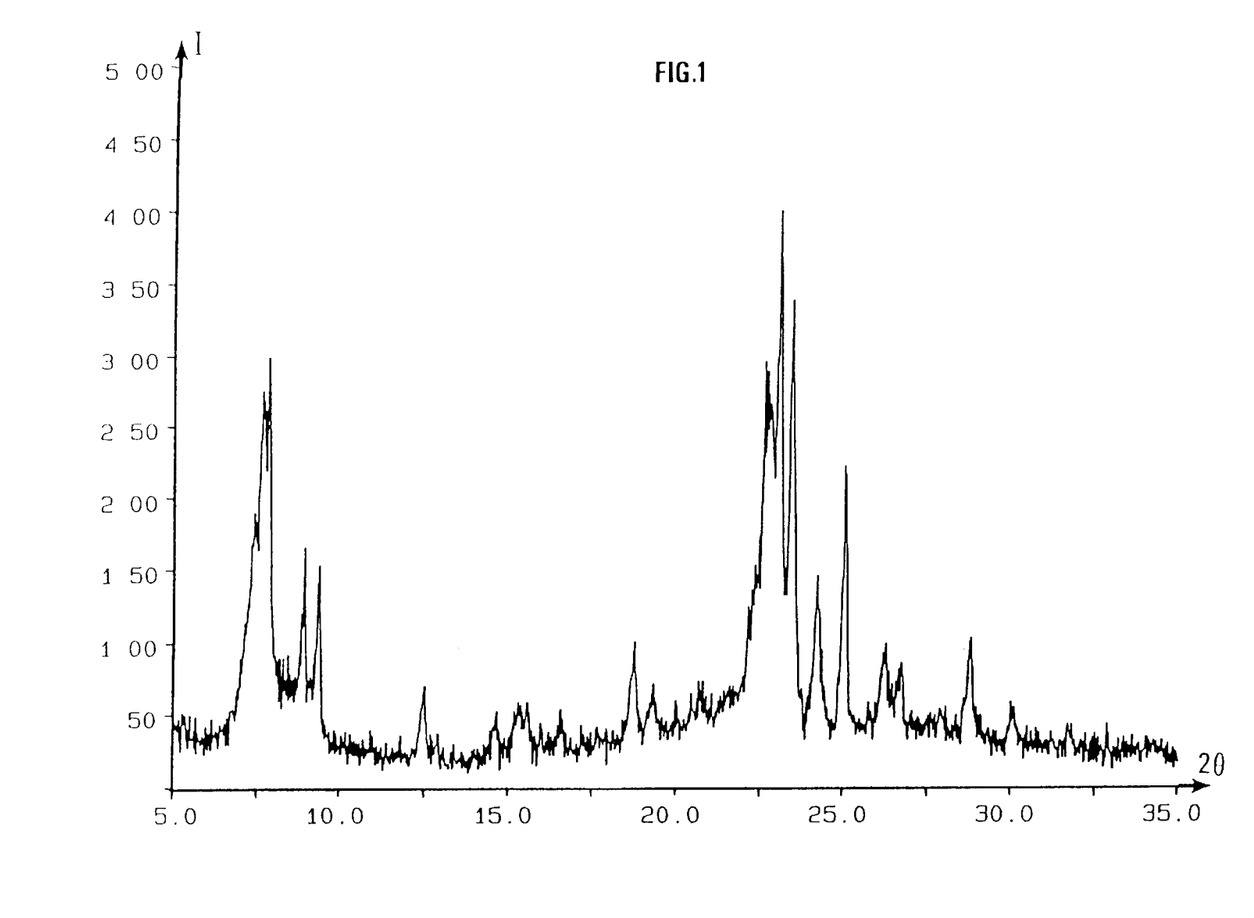
FIG. 1 shows an X-ray diffractogram for zeolite IM-5 in its synthesized state.
Figure 2:
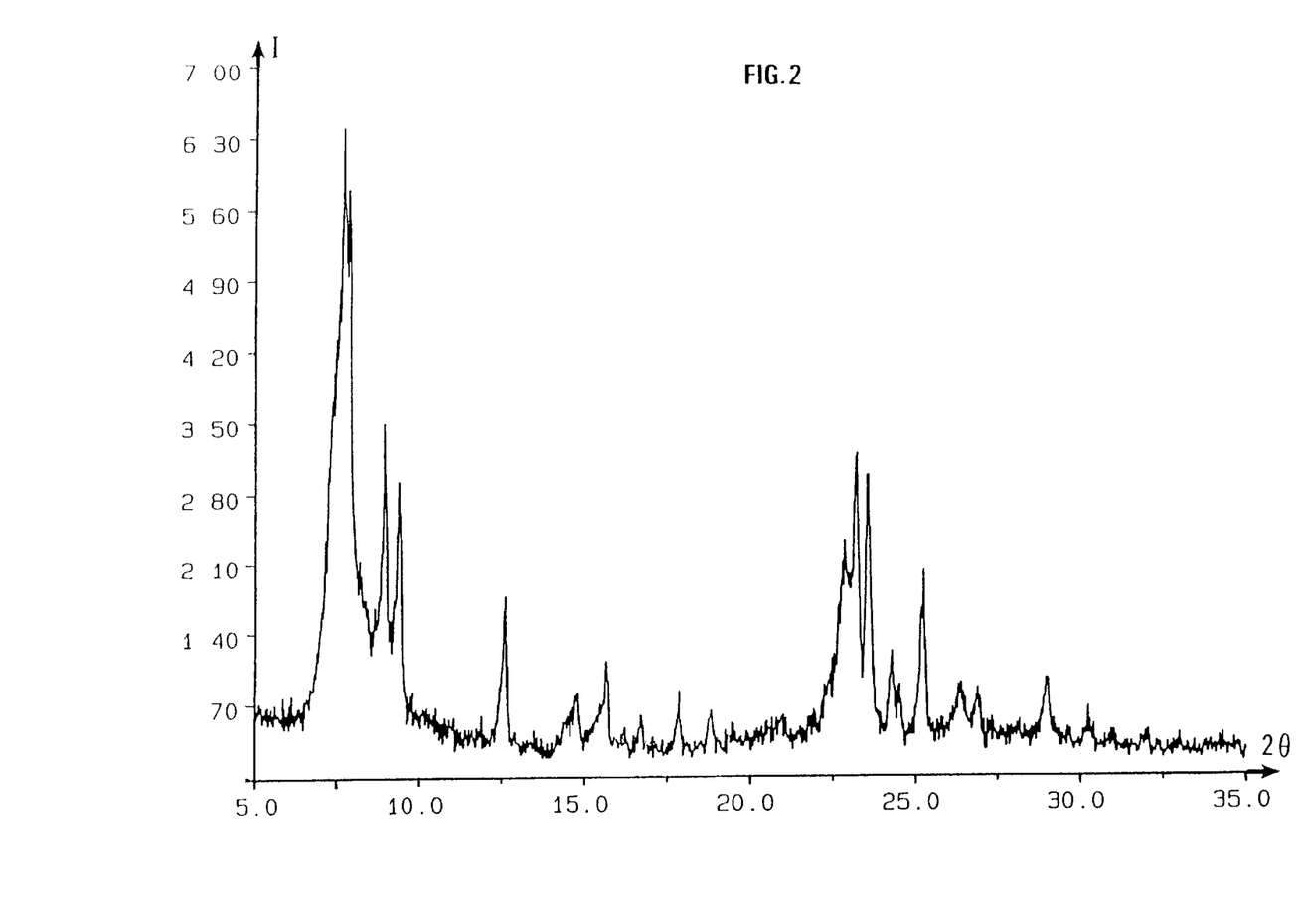
FIG. 2 shows an X-ray diffraction diagram for zeolite IM-5 obtained by calcining.

The dried solid product was analysed by powder X ray diffraction and identified as IM-5 zeolite. The diagram obtained agreed with the results shown in Table 1. The diffractogram is shown in FIG. 1 [with the intensity I (arbitrary units) as the ordinate and 2θ (Cu K alpha) as the abscissa].

The specific surface area of the IM-5 product was determined after calcining at 550° C. in dry air for 4 hours, and was found to be 530 $m^2/g$. The H-IM-5 product obtained had the diffractogram shown in FIG. 2 [with the intensity I (arbitrary units) as the ordinate and 2θ (Cu K alpha) as the abscissa].

Example 2

Synthesis of IM-5 zeolite with Pentane-1,5-bis (methylpyrrolidinium) Bromide (PentPyrr)

The same reaction mixture was used for this example as that of Example 1. However, the autoclave was heated for 8 hours at 170° C. in an oven provided with an apparatus which stirred the autoclave by rotation about an axis which was perpendicular to the axis of the cylinder constituting the autoclave, with a rotation speed of the order of 10 revolutions/minute.

After filtering, washing with $H_2O$ and drying at 60° C., 2.9 g of product was obtained.

Analysis of the Si, Al and Na in the product was carried out using atomic emission spectroscopy. The following molar composition was determined:

100 $SiO_2$; 4.3 $Al_2O_3$; 0.63 $Na_2O$.

The dried solid product was analysed by powder X ray diffraction and identified as being principally constituted by: IM-5 zeolite, of which the diagram obtained conformed with the results shown in Table 1, and a small amount, of the order of 5%, of ZSM-12.

Example 3

Synthesis of IM-5 zeolite with Hexane-1,6-bis (methylpyrrolidinium) Bromide (HexPyrr)

The structure of hexane-1,6-bis(methylpyrrolidinium) bromide is as follows:

The same reaction mixture as that of Example 1 was used, but no calcined NU-88 seeds were added, the quantity of Carlo Erba sodium aluminate was 0.281 g (instead of 0.32 g) and the 4.08 g of PentPyrr was replaced by 4.14 g of HexPyrr.

The molar composition of the synthesis gel corresponded to:

60 $SiO_2$, 1.50 $Al_2O_3$, 18 $Na_2O$, 10 HexPyrr, 3000 $H_2O$

The autoclave was oven heated for 13 days at 160° C. and stirred by rotation about an axis perpendicular to the axis of the cylinder of the autoclave. After filtering, washing with $H_2O$ and drying at 60° C., 2.5 g of product was obtained.

Analysis of the Si, Al and Na in the product was carried out using atomic emission spectroscopy. The following molar composition was determined:

100 $SiO_2$; 3.79 $Al_2O_3$; 0.45 $Na_2O$.

The dried solid product was analysed by powder X ray diffraction and identified as being principally constituted by IM-5 zeolite. The diagram obtained agreed with the results shown in Table 1.

Example 4

Synthesis of IM-5 zeolite with Pentane-1,5-bis (methylpyrrolidinium) Bromide (PentPyrr)

38 g of water was poured onto a solid mixture containing 3.6 g of Aerosil 130 silica and 4.08 g of PentPyrr. Stirring was carried out until a homogeneous mixture was obtained, then a solution obtained by dissolving 0.289 g of Carlo Erba sodium alumninate(about 54% $Al_2O_3$, 37% $Na_2O$), 0.618 g of NaBr and 1.22 g of caustic soda (NaOH) in 20 g of water was added, maintaining the stirring. This gel was stirred for 15 minutes before being transferred into an autoclave provided with a PTFE (polytetrafluoroethylene) sleeve.

The molar composition of the gel corresponded to:

60 $SiO_2$, 1.55 $Al_2O_3$, 18 $Na_2O$, 6 NaBr, 10 PentPyrr, 3000 $H_2O$

The autoclave was oven heated for 8.5 days at 170° C. under static conditions. After filtering, washing with $H_2O$ and drying at 60° C., 2.90 g of product was obtained.

Analysis of the Si, Al and Na in the product was carried out using atomic emission spectroscopy. The following molar composition was determined:

100 $Sio_2$; 3.8 $Al_2O_3$; 0.132 $Na_2O$.

The dried solid product was analysed by powder X ray diffraction and identified as IM-5 zeolite. The diagram obtained agreed with the results shown in Table 1. The diffractogram is shown in FIG. 1 [with the intensity I (arbitrary units) as the ordinate and 2θ (Cu K alpha) as the abscissa].

The specific surface area of the IM-5 product was determined after calcining at 550° C. in dry air for 4 hours, and was found to be 545 m²/g. The H-IM-5 product obtained had the diffractogram shown in FIG. 2 [with the intensity I (arbitrary units) as the ordinate and 2θ (Cu K alpha) as the abscissa].

Example 5

Evaluation of the Catalytic Properties of H-IM-5 by Cracking Methylcycohexane 1.2 g of H-IM-5 zeolite, prepared in Example 1, was introduced into a fixed bed tube reactor. The reactor temperature was raised to 500° C., then cyclohexane was introduced into the reactor. The diluting gas was nitrogen and the $N_2$/cyclohexane molar ratio admitted into the reactor was 12. The space velocity of methylcyclohexane, i.e., the mass of methylcyclohexane used per unit mass of H-IM-5 zeolite per unit of time, was such that it produced a 60% by weight conversion. The selectivities of the different products obtained are shown in the following table.

| Compounds | Selectivities (weight %) |
|---|---|
| Gas (C1 + C2 + C3 + C4) olefins and paraffins | 58.0 |
| C5—C6 compounds | 10.6 |
| C7 compounds, isomers of methylcyclohexane | 2.0 |
| Toluene + C8⁺ (1) | 29.4 |

(1) Compounds containing at least 8 carbon atoms.

This example shows that H-IM-5 zeolite is sufficiently active to crack methylcyclohexane and produce a gas (C1–C4) selectivity of 46.7% by weight for a conversion of 60% by weight.

We claim:

1. An IM-5 zeolite with a chemical composition with the following formula, expressed in terms of the mole ratios of the oxides for the anhydrous state:

$$100XO_2, mY_2O_3, pR_{2/n}O$$

where
  m is 10 or less;
  p is in the range of greater than 0 to 20;
  R represents one or more cations with valency n;
  X represents silicon and/or germanium;
  Y is selected from the group consisting of aluminum, iron, gallium, boron, and titanium, characterized in that said zeolite has an X ray diffraction diagram, in the synthesized state, which comprises the results shown in the table below:

| $d_{hkl}$ (Å) | $I/I_{max}$ |
|---|---|
| 11.8 ± 0.35 | s to vs (1) |
| 11.5 ± 0.30 | s to vs (1) |
| 11.25 ± 0.30 | s to vs (1) |
| 9.95 ± 0.20 | m to s |
| 9.50 ± 0.15 | m to s |
| 7.08 ± 0.12 | w to m |
| 6.04 ± 0.10 | vw to w |
| 5.75 ± 0.10 | w |
| 5.65 ± 0.10 | w |
| 5.50 ± 0.10 | vw |
| 5.35 ± 0.10 | vw |
| 5.03 ± 0.09 | vw |
| 4.72 ± 0.08 | w to m |
| 4.55 ± 0.07 | w |
| 4.26 ± 0.07 | vw |
| 3.92 ± 0.07 | s to vs (2) |
| 3.94 ± 0.07 | vs (2) |
| 3.85 ± 0.05 | vs (2) |
| 3.78 ± 0.04 | s to vs (2) |
| 3.67 ± 0.04 | m to s |
| 3.55 ± 0.03 | m to s |
| 3.37 ± 0.02 | w |
| 3.30 ± 0.015 | w |
| 3.099 ± 0.012 | w to m |
| 2.970 ± 0.007 | vw to w |
| 2.815 ± 0.005 | vw |
| 2.720 ± 0.005 | vw | wherein the (1) peaks are not resolved and form a part of a feature, and the (2) peaks are not resolved and form part of a feature.

2. A zeolite according to claim 1, in which m is in the range 0.8 to 8.

3. A zeolite according to claim 1, having the following chemical composition, expressed in terms of the mole ratios of the oxides for the anhydrous state:

$$100XO_2:10 \text{ or less } Y_2O_3:10 \text{ or less } Q:10 \text{ or less } M_2O,$$

where
  X is silicon and/or germanium;
  Y is selected from the group consisting of aluminum, iron, gallium, boron and titanium;
  M is at least one alki metal cation and/or ammonium; and Q is at least one organic nitrogen-containing cation or a precursor of an organic nitrogen-containing cation or a decomposition product of an organic nitrogen-containing cation; at least one compound of type M or Q being present.

4. A zeolite according to claim 3, in which:

Q is a bis(methylpyrrolidinium) cation, or one of its decomposition products or one of its precursors, with general formula:

where n=5 or 6.

5. A zeolite according to claim 3, in which Q is hexane-1,6-bis(methylpyrrolid-inium) bromide or pentane-1,5-bis(methylpyrrolidinium) bromide.

6. A zeolite according to claim 1, in which X is silicon and Y is aluminium.

7. A zeolite according to claim 1, at least partially in its $H^+$ or $NH_4^+$ or metallic form, said metal being selected from the group consisting of groups IA, IB, IIA, IIB, IIIA, IIIB (including the rare earths), VIII, Sn, Pb and Si.

8. A process for the preparation of the zeolite according to claim 1, in which an aqueous mixture comprising at least one source of at least one oxide $XO_2$, at least one source of at least one oxide $Y_2O_3$, optionally at least one source of at least one oxide $M_2O$, and at least one organic nitrogen-containing cation Q, or precursors thereof, are reacted, the mixture having the following molar composition:

$XO_2/Y_2O_3$ at least 10;
$(R_{1/n})OH/XO_2$ of 0.01 to 2;
$H_2O/XO_2$ of 1 to 500;
$Q/XO_2$ of 0.005 to 1;
$L_qZ/XO_2$ of 0 to 5;

wherein X is silicon and/or germanium;
Y is selected from the group consisting of aluminum, iron, boron, titanium, and gallium;
R is a cation with valency n which comprises M and/or Q, wherein M is an alkali metal and/or ammonium cation, and Q is an organic nitrogen-contaning cation or a precursor thereof or a decomposition product thereof;
$L_qZ$ is a salt, Z being an anion with valency q and L an alka metal ion or ammonium ion which may be the same as M or a mixture of M and a further alkali metal or ammonium ion required to balance anion Z, and Z may comprise an acid radical which is added in the form of a salt of L or an aluminum salt.

9. A process according to claim 8, in which at least one crystalline seed is also introduced into the aqueous mixture.

10. A process according to claim 8, in which the crystalline seed is selected from the group formed by a seed of NU-88 zeolite and a seed of IM-5 zeolite.

11. A process according to claim 8, in which Q is a bis(methylpyrrolidinium) cation or one of its decomposition products or one of its precursors, with general formula where n=5or 6.

12. A process according to claim 8, in which the $(R_{1/n})OH/XO_2$ ratio is in the range 0.1 to 0.75.

13. A process according to claimed 8, in which the $(R_{1/n})OH/XO_2$ ratio is in the range 0.4 to 0.75.

14. A process according to claim 8, in which Q is hexane-1,6-bis(methylpyrrolidinium) bromide or pentane-1,5-bis(methylpyrrolid-inium) bromide.

15. A process according to claim 8, in which the aqueous medium comprises a salt $L_qZ$.

16. A process according to claim 8, further comprising a calcining step.

17. A preparation process according to claim 8, further comprising a $H^+$ or $NH_4^+$ exchange step.

18. A process according to claim 8, further comprising a step for exchanging a metal selected from the group consisting of groups IA, IB, IIA, IIB, IIIA, IIIB (including the rare earths), VIII, Sn, Pb and Si.

19. A catalyst comprising a zeolite according to claim 1.

20. A catalyst according to claim 19, further comprising a binder or a support or a further zeolite or a metal selected from the group consisting of Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

21. In a catalytic hydrocarbon conversion process, the improvement comprising conducting the process in contact with a catalyst according to claim 19.

22. A zeolite with the following chemical composition, expressed in terms of the mole ratios of the oxides for the anhydrous state:

$100XO_2:10$ or less $Y_2O_3$: in the range 0 (excluded) to 10 $M_2O$ where
X is silicon and/or germanium;
Y is selected from the group consisting of aluminum, iron, gallium, boron and titanium;
M is at least one alkali metal cation and/or ammonium and/or hydrogen, characterized in that in the calcined form, said zeolite has an X ray diffraction diagram comprising the results shown in the table below:

| $d_{hkl}$ (Å) | $I/I_{max}$ |
|---|---|
| 11.8 ± 0.30 | s to vs (1) |
| 11.45 ± 0.25 | vs (1) |
| 11.20 ± 0.20 | s to vs (1) |
| 9.90 ± 0.15 | m to s |
| 9.50 ± 0.15 | m to s |
| 7.06 ± 0.12 | w to m |
| 6.01 ± 0.10 | vw to w |
| 5.70 ± 0.10 | w |
| 5.30 ± 0.10 | vw |
| 5.03 ± 0.09 | vw |
| 4.71 ± 0.08 | w |
| 4.25 ± 0.07 | vw |
| 3.87 ± 0.07 | m to s (2) |
| 3.81 ± 0.05 | m to s (2) |
| 3.76 ± 0.04 | m to s (2) |
| 3.67 ± 0.04 | w to m |
| 3.54 ± 0.04 | m to s |
| 3.37 ± 0.03 | w |
| 3.316 ± 0.015 | w |
| 3.103 ± 0.012 | w |
| 3.080 ± 0.010 | w to m |
| 2.950 ± 0.010 | vw to w |
| 2.880 ± 0.007 | vw |
| 2.790 ± 0.005 | vw |
| 2.590 ± 0.005 | vw | wherein the (1) peaks are not resolved and form a part of a feature, and the (2) peaks are not resolved and form part of a feature.

* * * * *